Patented May 23, 1933

1,910,847

UNITED STATES PATENT OFFICE

ALEXANDER T. MAXIMOFF, OF VERCELLI, ITALY, ASSIGNOR TO THE NAUGATUCK CHEMICAL COMPANY, OF NAUGATUCK, CONNECTICUT, A CORPORATION OF CONNECTICUT

POLYMERIZATION OF ERYTHRENE AND ITS HOMOLOGUES

No Drawing. Original application filed May 8, 1926, Serial No. 107,793. Divided and this application filed October 16, 1929. Serial No. 400,163.

This case is a division of my application Serial No. 107,793, filed May 8, 1926.

This invention relates to the polymerization of erythrene and its homologues and more particularly to the polymerization of emulsions of these compounds and to products obtained thereby.

The principal object of the invention is to provide a method for polymerizing emulsions of erythrene or its homologues to give synthetic rubber latex. Another object is to carry out such polymerization by means of fatty acids, fatty acid salts or of substances containing such fatty acid compounds. A further object is to accelerate such polymerization in the presence of agents of the oxidizing type such as peroxides, bichromates, etc., terpenes, and the like. Another object is to prepare a synthetic rubber latex or water emulsion.

The following examples illustrate methods of carrying out the invention, but they are not intended to serve as limitations, for other materials and proportions may be used. The invention comprises emulsifying erythrene or a homologue thereof in water with a fatty acid compound and polymerizing this emulsion in the presence of a peroxide, removing unpolymerized erythrene and recovering an aqueous emulsion of synthetic rubber, that is a synthetic rubber latex. The invention also includes the production of latices containing synthetic rubber as well as natural rubber.

One method of carrying out the invention is as follows: 100 parts of dimethyl-erythrene and 8.7 parts by weight of oleic acid are emulsified in 360 parts by volume of 10% ammonium hydroxide. To this emulsion are then added 18 parts by volume of a 3% hydrogen peroxide. The emulsion is then allowed to stand at room temperature for about 8 days. Unpolymerized dimethyl erythrene may be removed by heating the emulsion to the boiling point of dimethyl erythrene. The remaining emulsion comprises a synthetic rubber latex, in that it is a latex containing synthetic rubber in emulsified form. It may be coagulated by the addition of acetic acid or most of the other known coagulants for ordinary rubber latex.

The proportion of peroxide may be increased whereupon the amount of polymer will be increased, and the the same time may have somewhat different properties, particularly in its increased adhesiveness. Satisfactory results in respect to yield are obtained with about 1% of peroxide based on the dimethyl erythrene. With lesser amounts a smaller yield of polymer is obtained, while with greater amounts a larger yield of more adhesive polymer is obtained. The time and temperature may be varied to control the extent of polymerization. Polymerization of the dimethyl erythrene may be accelerated by carrying out the process at say 50-150° C., in which instance the length of time will be much less than 8 days in the above example. Instead of hydrogen peroxide, other oxidizing agents may be employed. Potassium bichromate may be used and other well known oxidizing agents.

In the above example the oleic acid and ammonia form ammonium oleate, and in some instances it may be desirable to add ammonium oleate as such instead of forming this compound in the emulsion. Other bases may be used instead of ammonium hydroxide, although the latter is preferred. Saponin may be employed in the formation of the emulsion. In the above example ammonium oleate acts as a polymerization agent, while the peroxide functions as an accelerator of such polymerization. This being the case the peroxide may be omitted if desired. As an illustration, 100 grams of dimethyl erythrene may be emulsified with 3.6 grams of oleic acid and 120 ccs. of 10% ammonium hydroxide. This emulsion will give a synthetic rubber latex containing about 15% of rubber after five days standing at room temperature. The addition of 35 cc. of 3% hydrogen peroxide to this emulsion will in the same time give in the neighborhood of 40% of synthetic rubber. Doubling the amount of oleic acid in the same example will add another 10% to the amount of polymer formed in the same time.

An acceleration of polymerization is also exhibited by other fatty acids, such as stearic acid. The use of oxidized linseed oil for example as a source of fatty acid likewise furnishes an increased yield of rubber. In five days at room temperature an emulsion containing dimethyl erythrene, oleic acid, ammonia and oxidized linseed oil yielded about 80% of rubber. The property of acting as polymerization agents is exhibited by oxidized fatty acids, as well as by ammonium salts and ethers of the unsaturated aliphatic acids.

Dimers of the terpene series function as accelerators of polymerization. An emulsion is made of 100 grams of dimethyl erythrene, 10 grams of oleic acid, 350 cc. of 10% ammonium hydroxide, 70 cc. of 3% hydrogen peroxide and 1 cc. of turpentine. This emulsion, after standing for 5 days at room temperature will give approximately 65% of rubber.

Similar results may be obtained with erythrene instead of dimethyl erythrene, but since erythrene is a gas at ordinary temperatures, the polymerization must be carried out under pressure, for example in an autoclave at 2-3 atmospheres. The unpolymerized erythrene will evaporate off when the pressure is released.

To produce a latex of synthetic rubber, substantially similar to natural latex, one may add to the emulsion suitable proteins, resins and inorganic material. The synthetic rubber latex may be blended with natural latex. The above invention furnishes a method for preparing the so-called artificial latices. Ordinary rubber, such as crepe, may be softened with dimethyl erythrene and then emulsified in water containing a polymerizing agent such as ammonium oleate, and if desired, an accelerator of polymerization. This emulsion, wherein the rubber and the erythrene are discontinuous phases, when allowed to stand for a few days at room temperature, will comprise an artificial latex containing synthetic rubber. If erythrene be used in place of dimethyl erythrene the emulsification and polymerization may be carried out under pressure. Either vulcanized or reclaimed rubber may be used instead of crude rubber.

In place of erythrene, its homologues, such as isoprene, piperylene, phenyl-butadiene, and also styrol, etc. may be employed. The homologues of erythrene include acyl aryl and heterocyclic substitutions.

By changing the proportions of catalyst and by using different accelerators of polymerization, various properties of synthetic rubber latex may be obtained. It is possible by this means to obtain a latex which will yield a very sticky rubber, suitable for adhesive purposes.

If it be desired to recover rubber from these synthetic latices, it is only necessary to add a latex coagulant, for example acetic acid, and the rubber is coagulated and may be recovered in the usual way. The synthetic rubber may be recovered, if desired, by evaporation of the latex, or by spraying, or by other methods.

Having thus described my invention, what I claim and desire to protect by Letters Patent is:

1. A method for preparing a rubber dispersion which comprises softening rubber with a rubber-forming hydrocarbon, emulsifying the softened rubber, and polymerizing the rubber-forming hydrocarbon in the emulsion.

2. A method for preparing a rubber dispersion which comprises softening rubber with an erythrene, emulsifying the softened rubber in water containing an emulsifying agent, and polymerizing the erythrene in the emulsion.

3. As a new product, an aqueous dispersion containing both natural rubber and synthetic rubber as discontinuous phases in the aqueous medium thereof, said synthetic rubber being a polymerization product of a diene hydrocarbon.

4. As a new product, an aqueous dispersion containing both natural rubber and a butadiene rubber as discontinuous phases.

5. As a new product, an aqueous dispersion containing both natural rubber and dimethyl erythrene rubber as discontinuous phases.

6. As a new product, an aqueous dispersion containing both natural rubber and mono-methyl-erythrene rubber as discontinuous phases.

7. A method of preparing a rubber dispersion which comprises softening rubber with a rubber-forming hydrocarbon, emulsifying said softened rubber in an aqueous medium containing a polymerizing agent and an accelerator of the polymerization, and then polymerizing the rubber emulsion.

8. As a new product an artificially prepared latex in which both natural rubber and synthetic rubber form dispersed phases, the disperse or continuous phase thereof comprising water and a soap, said synthetic rubber being a polymerization product of a diene hydrocarbon.

Signed at Milan, Italy, this 27th day of September, 1929.

ALEXANDER T. MAXIMOFF.